United States Patent [19]

Shida et al.

[11] Patent Number: 5,424,902
[45] Date of Patent: Jun. 13, 1995

[54] METHOD OF POLARIZING ELECTRIC MOTOR PROVIDED WITH STATOR HAVING PLURAL PHASE WINDINGS AND ROTATOR HAVING PLURAL PERMANENT MAGNETS

[75] Inventors: Yoshiharu Shida, Shizuoka; Akinori Higashide, Fuji, both of Japan

[73] Assignee: Kabushiki Kaisha Toshiba, Kawasaki, Japan

[21] Appl. No.: 174,068

[22] Filed: Dec. 28, 1993

[30] Foreign Application Priority Data

Dec. 28, 1992 [JP] Japan ................. 4-349434
Sep. 14, 1993 [JP] Japan ................. 5-229061

[51] Int. Cl.⁶ .................. H01F 13/00; H01H 47/00
[52] U.S. Cl. .................. 361/148; 335/284; 361/147

[58] Field of Search .......... 335/284; 361/143, 147, 361/148

[56] References Cited

U.S. PATENT DOCUMENTS

4,748,535  5/1988  Arawaka et al. ............... 361/148
5,075,814  12/1991  Kubota et al. ............... 361/143

Primary Examiner—Gerald P. Tolin
Assistant Examiner—Ramon M. Barrera
Attorney, Agent, or Firm—Cushman Darby & Cushman

[57] ABSTRACT

A positioning current is supplied to each phase winding of a stator employed in an electric motor, thereby rotating a rotator in the motor to a predetermined reference position with the use of magnetic force created by the positioning current. Thereafter, a polarizing current is supplied to each phase winding of the stator, thereby polarizing permanent magnets incorporated in the rotator.

12 Claims, 9 Drawing Sheets

METHOD OF POLARIZING ELECTRIC MOTOR PROVIDED WITH STATOR HAVING PLURAL PHASE WINDINGS AND ROTATOR HAVING PLURAL PERMANENT MAGNETS

BACKGROUND OF THE INVENTION

1. Field of the Invention

This invention relates to a method of polarizing an electric motor for use in a compressor, etc.

2. Description of the Related Art

Recent air conditioners have a compressor of a variable capacity type for performing an energy-saving operation. Compressors of this type are equipped with a speed-variable type electric motor driven by the output of an inverter.

Some of the above compressors have a stator with a plurality of phase windings and a rotator with a plurality of permanent magnets. The rotator rotates as a result of interaction between rotary magnetic fields created by the phase windings and magnetic field created by the permanent magnets.

Each of the permanent magnets is molded by stiffening magnetic particles, and then mounted on the rotator. In this stage, the permanent magnets are not polarized. A polarization treatment is performed after rotator components are assembled. Specifically, the permanent magnets are polarized by connecting the phase windings of the stator to polarizing power source and supplying a polarizing current to the phase windings.

At the time of polarization, it is necessary to align the central points of the permanent magnets with lines of magnetic force created by the polarizing current. If such an alignment is not performed at the time of polarization, each permanent magnet may not be sufficiently polarized, or the magnetic poles of the magnet may be displaced from predetermined positions.

When the magnet is not sufficiently polarized, the efficiency of the electric motor is reduced.

On the other hand, when the magnetic poles are displaced from predetermined positions, the position of the rotator cannot be accurately detected, which may cause loss of synchronism in the motor during operation or render the motor inoperable. As a result, an abnormal current may flow through each phase winding, and hence circuit elements of an inverter employed on the driving side be broken.

To avoid the above, positioning is performed beforehand so that the central points of the permanent magnets are aligned with lines of magnetic force created by the phase windings. In the conventional method, however, the positioning is performed based on eye-estimation of a worker, and therefore cannot be done accurately.

SUMMARY OF THE INVENTION

It is the object of the invention to provide a method of aligning the central points of permanent magnets with lines of magnetic force created by a polarizing current, so as to correctly and sufficiently polarize the magnets and to form the poles thereof in correct positions.

According to the invention, there is provided a polarizing method of polarizing an electric motor, which incorporates a stator having a plurality of phase windings; a rotator having a yoke, a plurality of permanent magnets provided around the yoke, an annular portion surrounding the permanent magnets, and a plurality of connecting portions located between each adjacent pair of the permanent magnets and connecting the yoke to the annular portion, the method comprising:

the first step of supplying a positioning current to each of the phase windings of the stator, and rotating the rotator to a predetermined reference position with the use of magnetic forces created by the positioning current and acting on the connecting portions; and the second step of polarizing the permanent magnets by supplying a polarizing current to the phase windings of the stator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Embodiments of the invention will be explained in detail with reference to the accompanying drawings.

Figure 1:
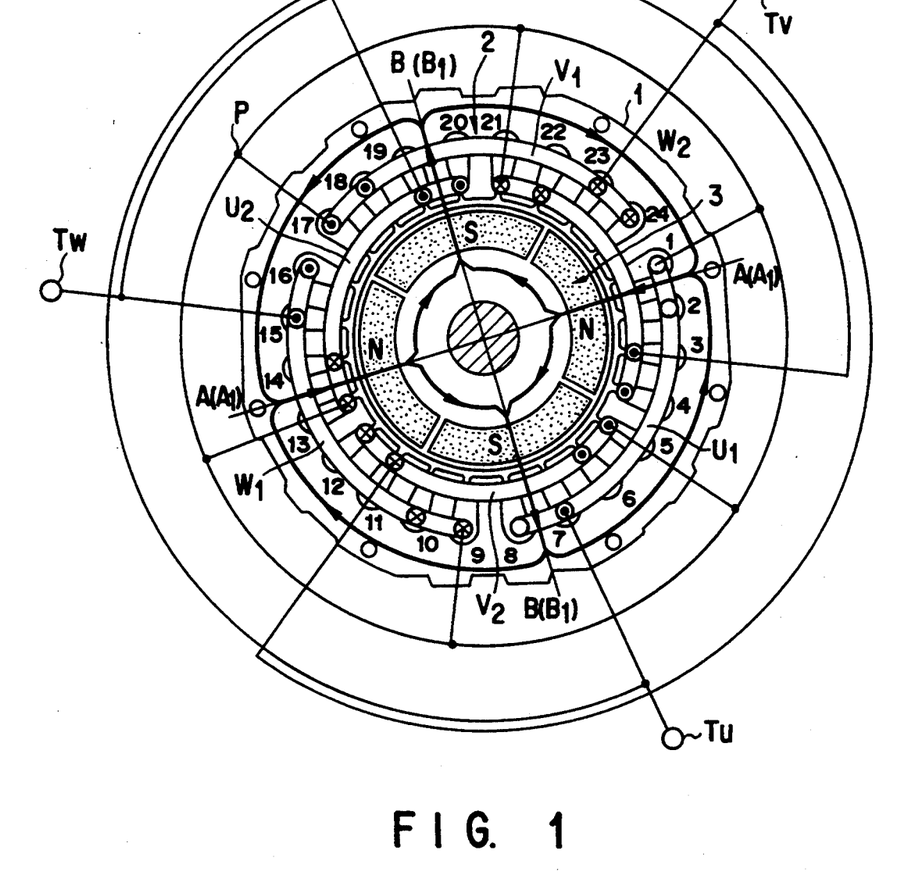
FIG. 1 is a plan view, showing a stator and a rotator employed in a first embodiment of the invention, and magnetic forces acting at the time of polarization.

As is shown in FIG. 1, a plurality of phase windings 2 are buried in a plurality of slots formed in the inner peripheral surface of a stator 1. A rotator 3 is provided in the stator 1.

Figure 2:
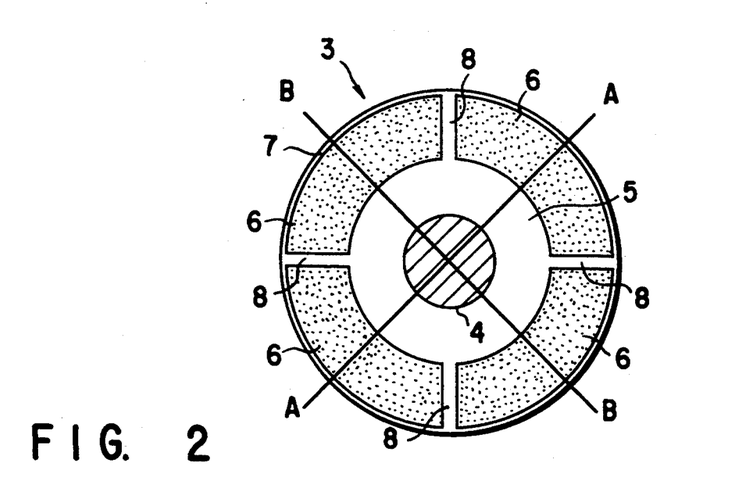
FIG. 2 is a plan view, showing a rotator employed in first embodiment and a second embodiment.

FIG. 2 shows an essential part of the stator 3. The stator 3 has a yoke 5 provided around a rotator shaft 4, a plurality (e.g. four) of permanent magnets 6 provided around the yoke 5, an annular portion 7 provided around the permanent magnets 6, and four connecting portions 8 located between each adjacent pair of the permanent magnets 6 and magnetically connecting the yoke 5 to the annular portion 7.

Two of the permanent magnets 6 are located diametrically symmetrically, and so are the other two permanent magnets. The central points of the first-mentioned two magnets (i.e., the central points in a direction corresponding to the circumferential direction of the yoke 5) are positioned in line A—A of FIG. 2. Similarly, the central points of the other two magnets (i.e., the central points in a direction corresponding to the circumferential direction of the yoke 5) are positioned in line B—B of FIG. 2.

Figure 3:
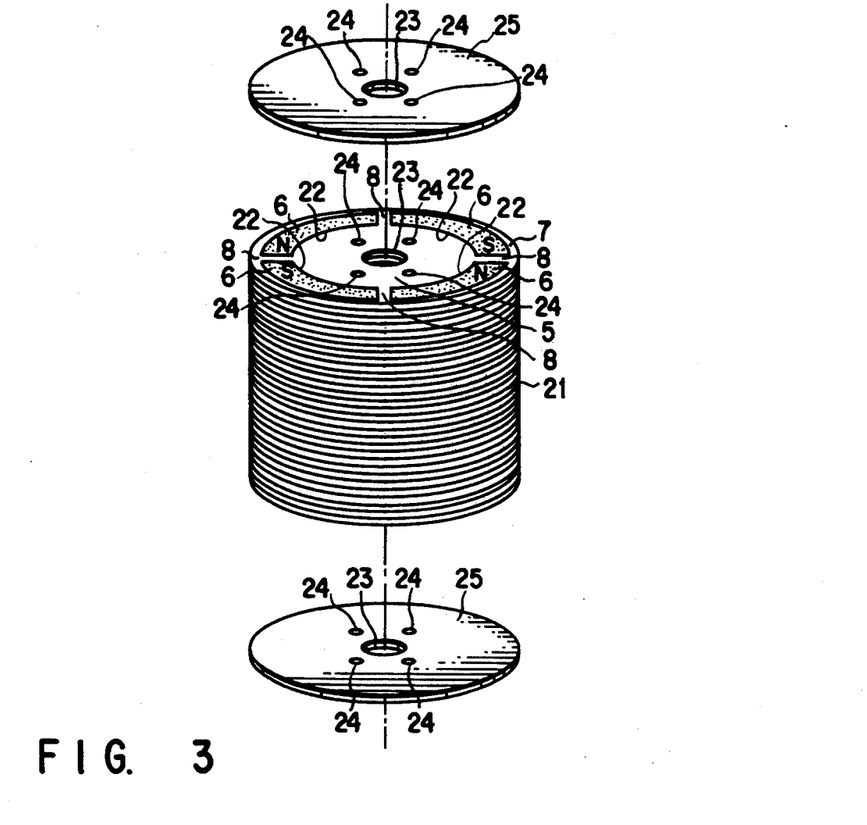
FIG. 3 is a perspective view, more specifically showing the rotator employed in the first and second embodiments.

Referring then to FIG. 3, a plurality of steel plates 21 are laminated and adhered to one another, thereby integrally forming the yoke 5, the annular portion 7 and the connecting portions 8 as one body. Each of the steel plates 21 has four insertion holes 22 formed in peripheral edge portions thereof and inserting the permanent magnets 6 therethrough; an insertion hole 23 inserting the rotary shaft 4 therethrough; and four rivet-insertion holes 24 formed in the yoke 5 around the insertion hole 23. End plates 25 are attached to the upper and lower steel plates 21. Each of the plates 25 has the insertion hole 23 and four rivet-insertion holes 24. The rotator 3 is assembled in the following manner: First, the steel plates 21 are laminated, and the permanent magnets 6 are inserted in the insertion holes 22. The permanent magnets 6, which are molded by stiffening magnetic particles, have no polarity when they have been inserted into the holes 22. A polarization treatment performed later creates the magnetic poles of the magnets 6. Thereafter, the end plates 25 are attached to the both opposite ends of the laminated steel plates 21, respectively, and rivets (not shown) are inserted into the end plates 25 and the rivet-inserting holes 24 of each of the steel plates 21. Then, the both opposite ends of each rivet are caulked to fix the overall rotator 3.

Figure 4:
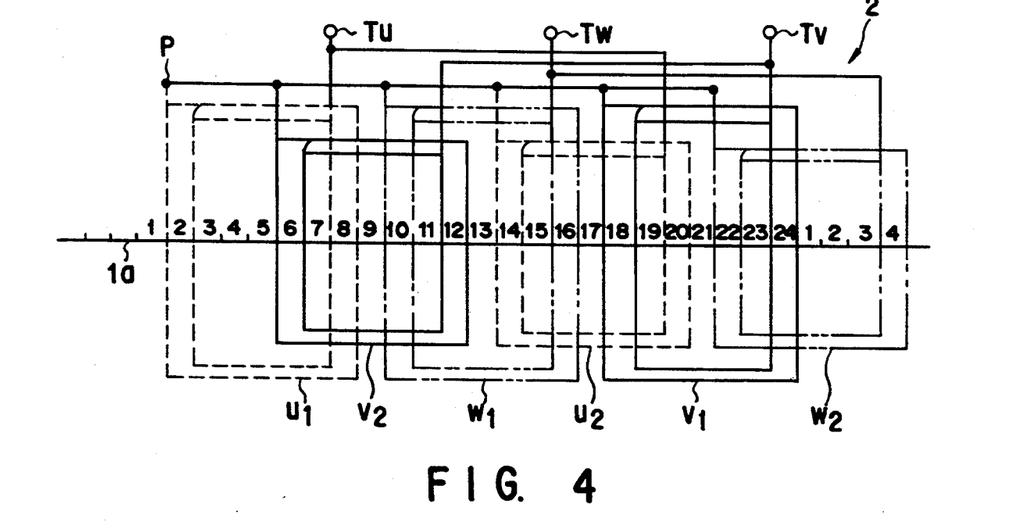
FIG. 4 is a plan view, showing a state where each phase winding is mounted on a corresponding one of the slots of the stator employed in the first and second embodiments.

The phase windings 2 of the stator 1 are pseudo four-polar three-phase windings, and each include first-phase windings $U_1$ and $U_2$, second-phase windings $V_1$ and $V_2$ and third-phase windings $W_1$ and $W_2$. These windings are buried in each slot 1a of the stator 1. The slots 1a have slot numbers "1"–"24", respectively. Further, the first-phase windings $U_1$ and $U_2$ are connected to a terminal Tu, the second-phase windings $V_1$ and $V_2$ to a terminal Tv, and the third-phase windings $W_1$ and $W_2$ to a terminal Tw.

Figure 6:
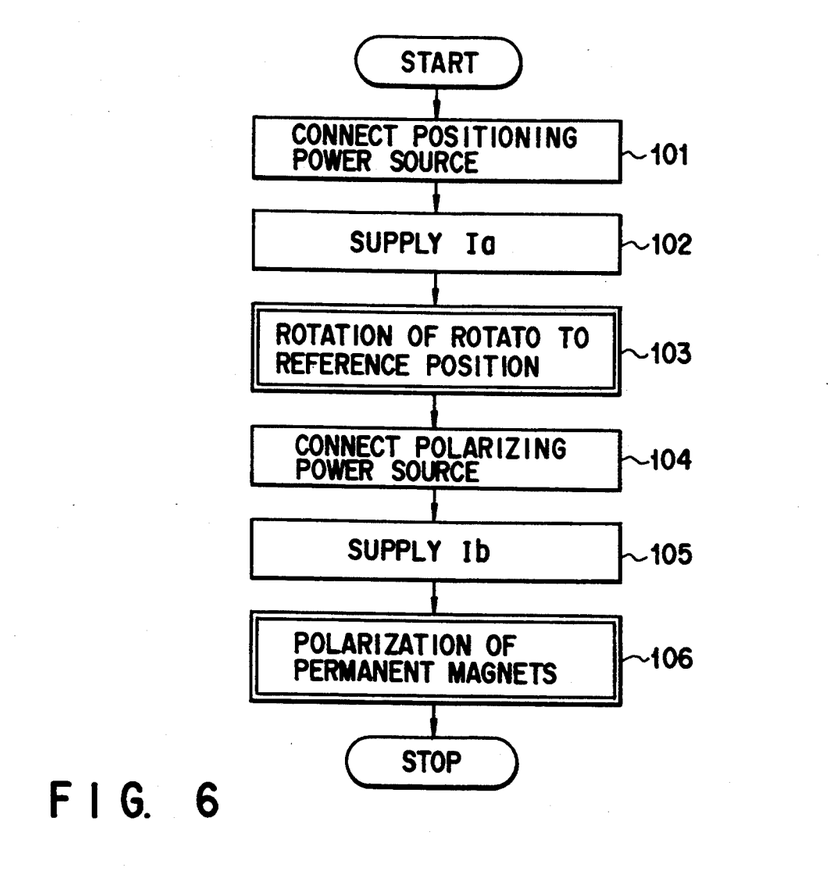
FIG. 6 is a flowchart, useful in explaining the operation of the first embodiment.

The operation of the first embodiment will now be explained with reference to the flowchart shown in FIG. 6.

Figure 5:
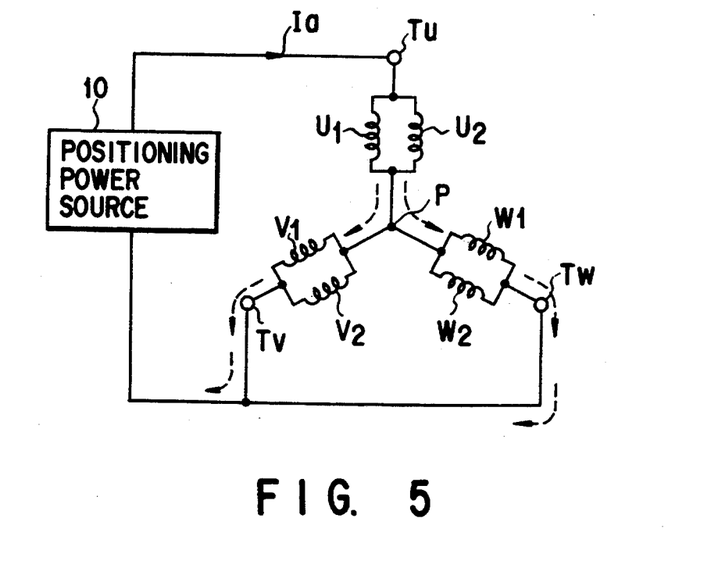
FIG. 5 is a circuit diagram, showing how each phase winding is connected to a positioning power source in the first and second embodiments.

As is shown in FIG. 5, the positive-side terminal of a positioning power source 10 is connected to the terminal Tu, and the negative-side terminal of the power source 10 is connected to the terminals Tv and Tw (step 101). Then, the power source 10 is turned on.

Upon being turned on, the power source 10 generates a DC voltage of 20–30 V, thereby supplying a positioning current Ia through the first-phase windings $U_1$ and $U_2$ to the second-phase windings $V_1$ and $V_2$ and the third-phase windings $W_1$ and $W_2$, respectively (step 102).

Figure 7:
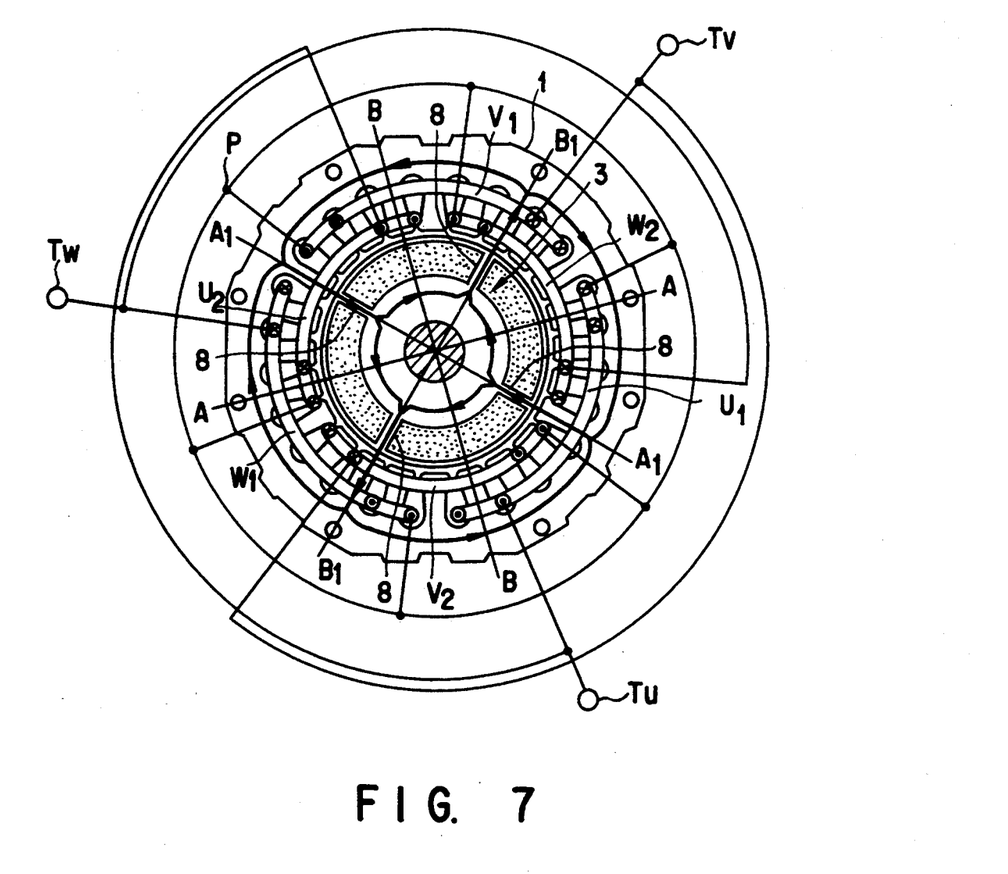
FIG. 7 is a plan view, showing magnetic forces created in the circuit of FIG. 5.

When the positioning current Ia has started to flow, magnetic forces indicated by the arrows of FIG. 7 is generated in the stator 1. Lines $A_1—A_1$ and $B_1$ and $B_1$ indicate the lines of the magnetic force acting through the rotator 3.

The magnetic forces generated in the stator 1 attract the connecting portions 8 of the rotator 3, thereby rotating the rotator 3. This rotation stops where the lines of magnetic force indicated by the arrows $A_1—A_1$ (or the arrows $B_1—B_1$) correspond to the lines which pass the connecting portions 8, as is shown in FIG. 7 (step 103). In a reference position where the rotator stops, the center of each permanent magnet 6 (in line A—A or line B—B) is between the line of magnetic force indicated by the arrows $A_1—A_1$ and that indicated by the arrows $B_1—B_1$. The positioning has thus been completed.

Figure 8:
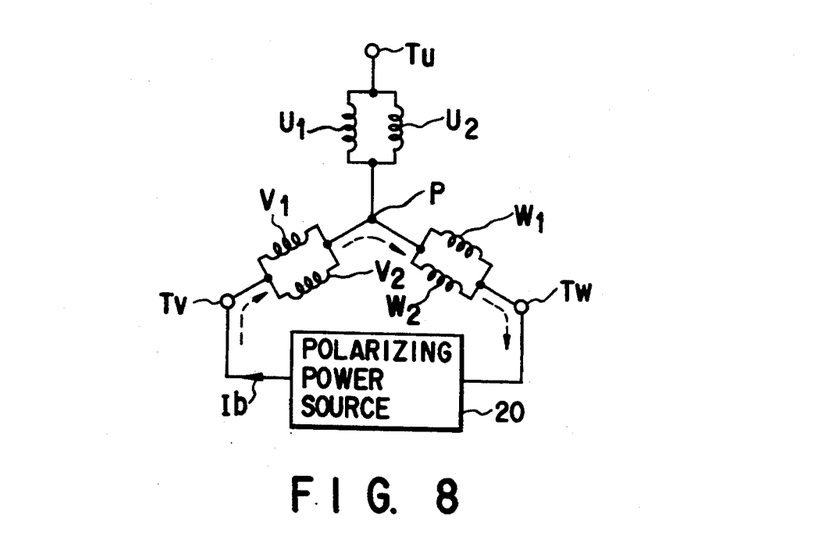
FIG. 8 is a circuit diagram, showing how the phase windings are connected to the polarizing power source in the first and second embodiments.

After completion of the positioning, the positive-side terminal and the negative-side terminal of the polarizing power source 20 are connected to the terminal Tv and the terminal Tw, respectively, as is shown in FIG. 8 (step 104). Then, the polarizing power source 20 is turned on.

Figure 9:
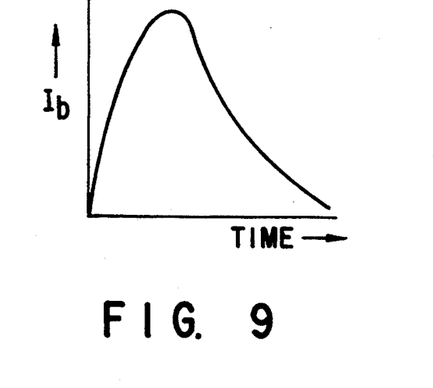
FIG. 9 is a graph, showing variations in a polarizing current in the first and second embodiments.

Upon being turned on, the power source 20 instantaneously generates a DC voltage of 800–900 V, thereby causing a polarizing current Ib shown in FIG. 9 to flow from the second phase windings $V_1$ and $V_2$ to the third phase windings $W_1$ and $W_2$ (step 105).

When the polarizing current Ib flows, the magnetic forces indicated by the arrows in FIG. 1 are generated in the stator 1. The lines of magnetic force (indicated by the lines $A_1—A_1$ and $B_1—B_1$) correspond to the lines passing the circumferentially central points of the permanent magnets 6 (indicated by the lines A—A and B—B). At this time, a pair of permanent magnets 6 which are opposed to each other are polarized to have N poles, while the other pair of magnets 6 are polarized to have S poles (step 106).

As described above, first, the rotator 3 is rotated by the use of the positioning current Ia to be situated in the reference position, and then the permanent magnets 6 are polarized by the use of the polarizing current Ib, with the result that the central points of 10 the permanent magnets 6 are accurately aligned with the lines of magnetic force caused by the polarizing current. In other words, the magnets 6 can be correctly and hence sufficiently polarized, thereby enhancing the efficiency of operation. Further, magnetic poles can be formed at correct portions of the permanent magnets 6, and therefore the rotator 3 be detected with accuracy.

Accurate detection of the position of the rotator 3 prevents loss of synchronism in the electric motor during operation, and enables the motor to be driven in a reliable manner. Accordingly, the phase windings are protected from an abnormal current, thus preventing the circuit elements of the driving-side inverter from being broken.

At the time of performing positioning in the steps 101–103, there is a case where each connecting portion 8 is positioned at a midpoint between the line $A_1—A_1$ of magnetic force and the line $B_1$ and $B_1$ of magnetic force. In this case, the magnetic force acting on each connecting portion 8 from the right balances that acting on the portion 8 from the left, so that it is possible that the rotator 3 does not rotate. If so, the rotator 3 cannot be moved to the reference position.

In order to deal with the above, a second embodiment has been developed.

Figure 10:
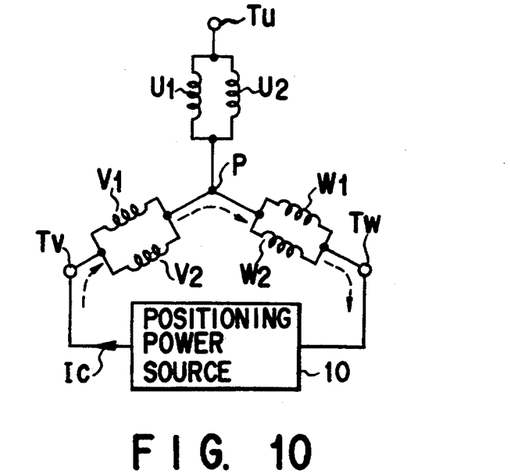
FIG. 10 is a circuit diagram, showing preliminary connection between the phase windings and the positioning power source in the second embodiment.
Figure 11:
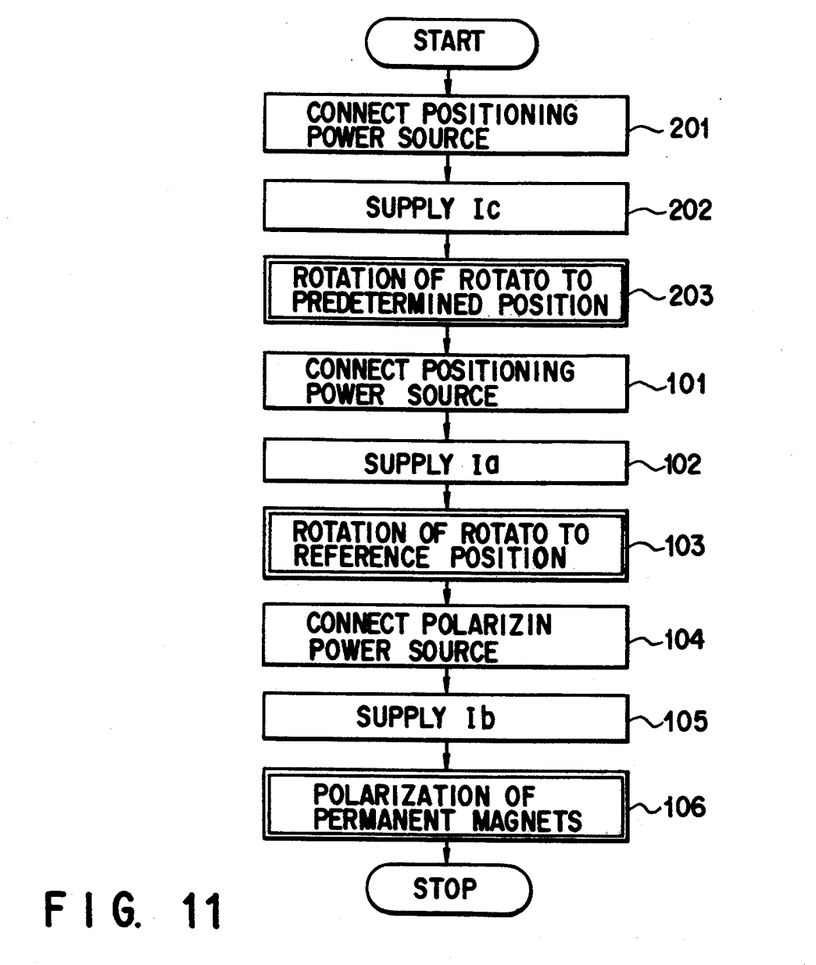
FIG. 11 is a flowchart, useful in explaining the operation of the second embodiment.

In the second embodiment, the rotator 3 is rotated to a predetermined position before performing the positioning of the steps 101–103, as can be understood from FIGS. 10 and 11.

Specifically, the positive-side terminal and the negative-side terminal of the positioning power source 10 are connected to the terminal Tv and the terminal Tw, respectively (step 201). Then, the power source 10 is turned on.

Upon being turned on, the power source 10 generates a DC voltage of 20–30 V, thereby causing the positioning current Ic to flow through the second phase windings $V_1$ and $V_2$ and the third phase windings $W_1$ and $W_2$ (step 202).

Figure 12:
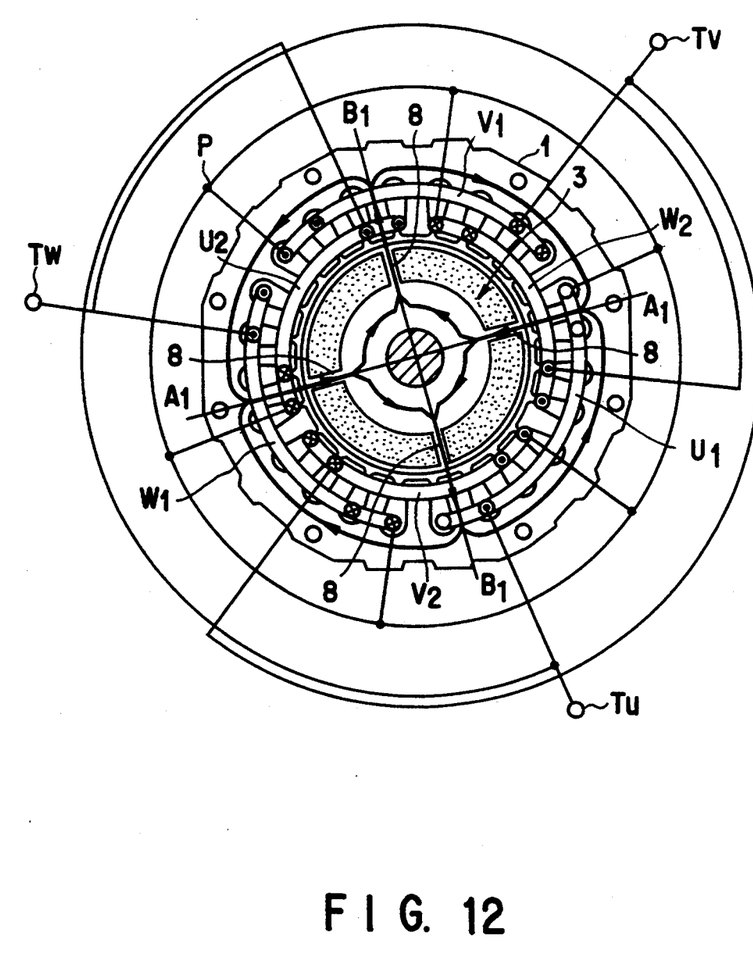
FIG. 12 is a plan view, showing magnetic forces created in the circuit of FIG. 10.

When the positioning current Ic has started to flow, magnetic forces indicated by the arrows in FIG. 12 are generated in the stator 1, and attract the connecting portions 8 of the rotator 3. Then, the rotator 3 is rotated to a predetermined position, and stops there (step 203).

In this predetermined position, the connecting portions 8 are not positioned at the midpoints between the lines $A_1—A_1$ and $B_1—B_1$ of magnetic force.

Rotating the rotator 3 to a predetermined position before performing the positioning in the steps 101–103 creates a difference between the magnetic forces which attract each connecting portion 8 from the right and the left. Thus, the rotator 3 can be reliably rotated to 10 the reference position, thereby correctly polarizing the permanent magnets 6.

Although in the first and second embodiments, the phase winding 2 of the stator 1 consists of a pseudo four-pole three-phase winding, a usual four-pole three-phase winding may be used as the phase winding.

Figure 13:
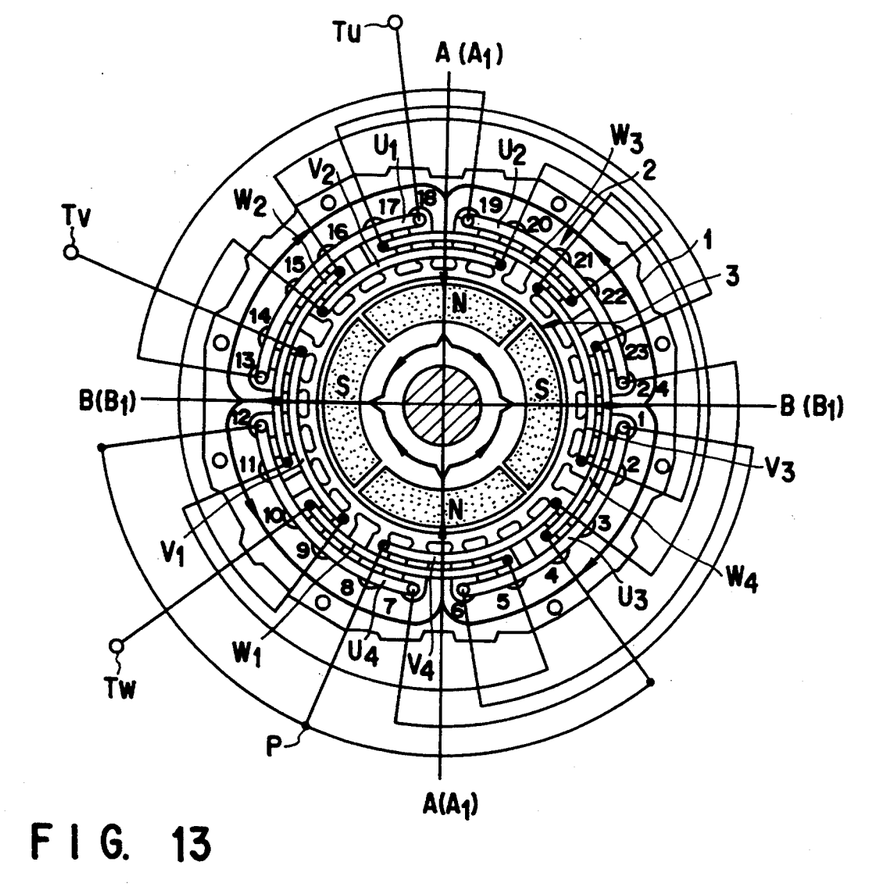
FIG. 13 is a plan view, showing a stator and a rotator employed in a third embodiment, and magnetic forces created at the time of polarization.
Figure 14:
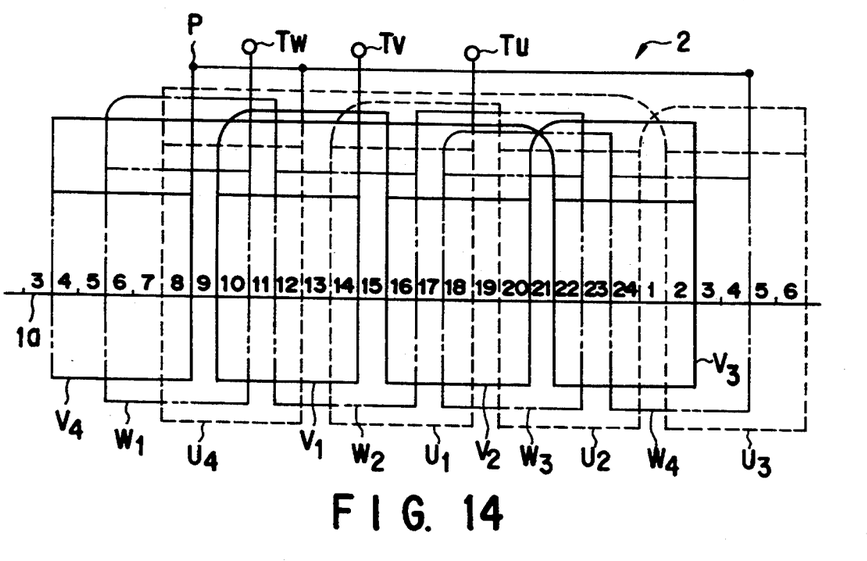
FIG. 14 is a plan view, showing a state where each phase winding is mounted on a corresponding one of the slots of the stator employed in the third embodiment.
Figure 15:
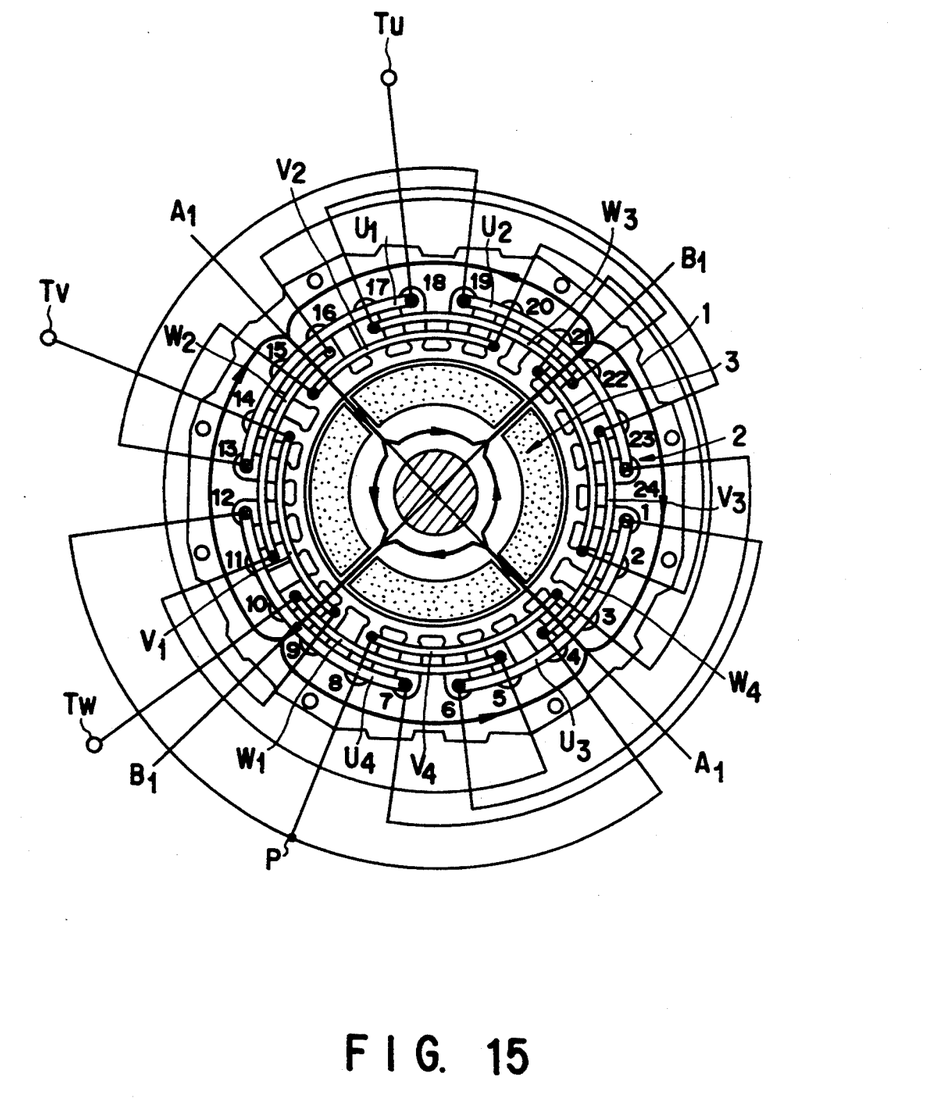
FIG. 15 is a view, showing the stator and the rotator employed in the third embodiment, and magnetic forces created at the time of positioning.

FIGS. 13, 14 and 15 show a third embodiment, which employs a usual four-pole three-phase winding as the phase winding.

FIG. 13 shows a stator and a rotator employed in the third embodiment, and magnetic forces created at the time of polarization; FIG. 14 shows a state where each phase winding is mounted on a corresponding one of the slots 1a of the stator 1; and FIG. 15 shows the stator and the rotator employed in the third embodiment, and magnetic forces created at the time of positioning.

The phase windings each include first-phase windings $U_1$, $U_2$ and $U_3$, second-phase windings $V_1$, $V_2$ and $V_3$ and third-phase windings $W_1$, $W_2$ and $W_3$. The other structural elements are similar to those employed in the first or second embodiment. The operation of the third embodiment is similar to that of the first or second embodiment.

Figure 16:
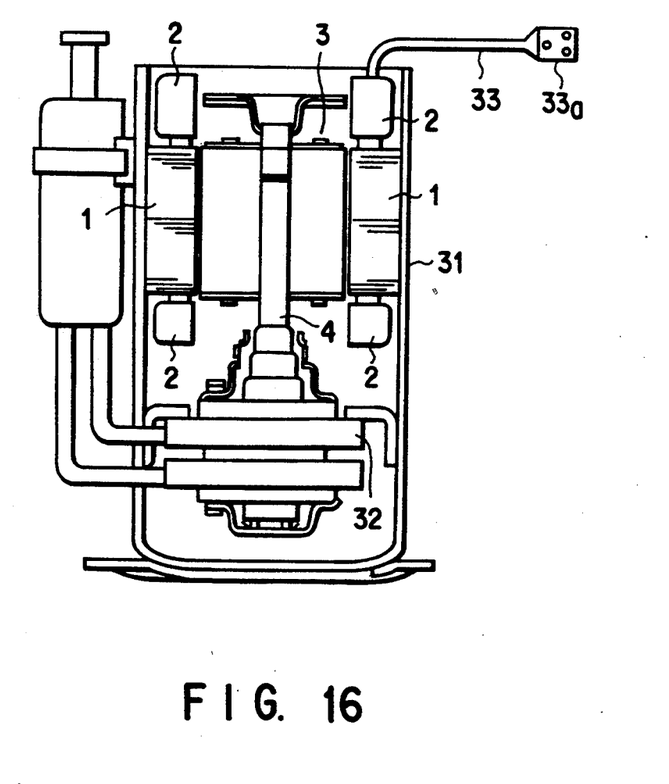
FIG. 16 is a cross sectional view, showing a compressor which incorporates any one of the electric motors of the embodiments.

As is shown in FIG. 16, for example, each of the electric motors according to the first through third embodiments is mounted in a compressor employed in an air conditioner. In FIG. 16, reference numeral 31 denotes the casing of the compressor. A compressor unit 32 is located in a bottom portion of the casing 31. The electric motor according to the first, second or third embodiment is incorporated in the casing 31 above the compressor unit 32.

Figure 17:
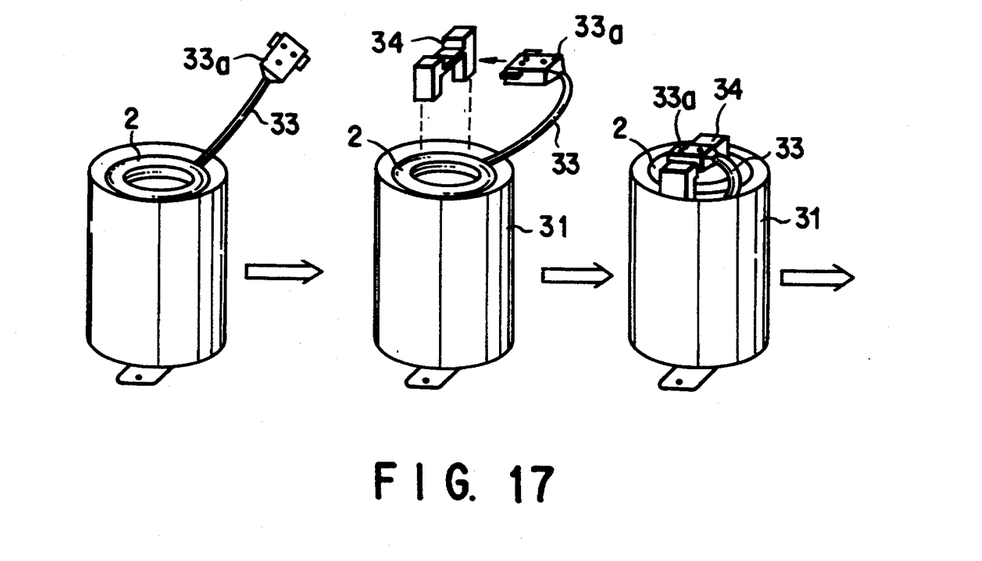
FIG. 17 is a perspective view, useful in explaining how to polarize the motor of FIG. 16.

As is shown in FIG. 17, the polarization of the permanent magnets 6 is performed in a state where the electric motor is received in the casing 31. While a table on which the casing 31 is placed is moved, the terminal 33a of the leading line 33 of the phase windings 2 is attached to a terminal attaching member 34. The terminal attaching member 34 is secured to an upper opening of the casing 31. Power is supplied via the terminal 33a to the permanent magnets 6 to polarize them.

The above polarization enables each permanent magnet to be polarized with high precision, with the compressor unit 32 and the electric motor received in the casing 31. This being so, the productivity of compressors can be enhanced without reducing the reliability thereof.

After polarization, the terminal attaching member 34 is dismounted from the casing 1, and the terminal 33a of the leading line 33 is detached from the terminal attaching member 34. The leading line 33 is then attached to the upper opening of the casing 31, and is electrically connected via the terminal 33a to the terminal receiving portion of a cover (not shown) for sealing the casing 31. Thereafter, the cover is attached to the upper opening of the casing 31 and welded to seal the same, which is the completion of assembling.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A polarizing method of polarizing an electric motor, which incorporates a stator having a plurality of phase windings; and a rotator having a yoke, a plurality of permanent magnets provided around the yoke, an annular portion surrounding the permanent magnets, and a plurality of connecting portions located between each adjacent pair of the permanent magnets and connecting the yoke to the annular portion, the method comprising:

the first step of supplying a positioning current to each of the phase windings of the stator, and rotating the rotator to a predetermined reference position with the use of magnetic force created by the positioning current and acting on the connecting portions; and the second step of polarizing the permanent magnets by supplying a polarizing current to the phase windings of the stator.

2. The method according to claim 1, wherein each of the phase windings includes a first-phase winding, a second-phase winding and a third-phase winding.

3. The method according to claim 2, wherein the positioning current flows to the second-phase winding and the third-phase winding through the first-phase winding in the first step, and the polarizing current flows from the second-phase winding to the third-phase winding in the second step.

4. The method according to claim 3, wherein when the rotator is in the predetermined reference position, the center of each of the permanent magnets, which is in a direction corresponding to a circumferential direction of the yoke, is positioned at a midpoint between each adjacent pair of lines of magnetic force created by the positioning current.

5. The method according to claim 4, further comprising the third step of supplying the positioning current from the second-phase winding to the third-phase winding before executing the first step, and rotating the rotator to a predetermined position with the use of magnetic force created by the positioning current and attracting the connecting portions.

6. The method according to claim 5, wherein when the rotator is in the predetermined position, each of the connecting portions is not positioned at a midpoint between corresponding adjacent two lines of magnetic force created by the positioning current in the first step.

7. A polarizing method of polarizing an electric motor in a state where the electric motor and a compressor unit are received in a casing, the electric motor incorporating: a stator having a plurality of phase windings; and a rotator having a yoke, a plurality of permanent magnets provided around the yoke, an annular portion surrounding the permanent magnets, and a plurality of connecting portions located between each adjacent pair of the permanent magnets and connecting the yoke to the annular portion, the method comprising:

the first step of fixing the electric motor and the compressor unit;

the second step of supplying a positioning current to each of the phase windings of the stator, and rotating the rotator to a predetermined reference position with the use of magnetic force created by the positioning current and acting on the connecting portions; and the third step of polarizing the permanent magnets by supplying a polarizing current to the phase windings of the stator.

8. The method according to claim 7, wherein each of the phase windings includes a first-phase winding, a second-phase winding and a third-phase winding.

9. The method according to claim 8, wherein the positioning current flows to the second-phase winding and the third-phase winding through the first-phase winding in the second step, and the polarizing current flows from the second-phase winding to the third-phase winding in the third step.

10. The method according to claim 9, wherein when the rotator is in the predetermined reference position, the center of each of the permanent magnets, which is in a direction corresponding to a circumferential direction of the yoke, is positioned at a midpoint between each adjacent pair of lines of magnetic force created by the positioning current.

11. The method according to claim 10, further comprising the fourth step of supplying the positioning current from the second-phase winding to the third-phase winding before executing the second step, and rotating the rotator to a predetermined position with the use of magnetic force created by the positioning current and attracting the connecting portions.

12. The method according to claim 11, wherein when the rotator is in the predetermined position, each of the connecting portions is not positioned at a midpoint between corresponding adjacent two lines of magnetic force created by the positioning current in the second step.

* * * * *